April 6, 1948. S. L. ADELSON 2,439,121
RATE OF FLOW TELEMETERING ACTUATOR
Filed Nov. 26, 1945 3 Sheets-Sheet 1
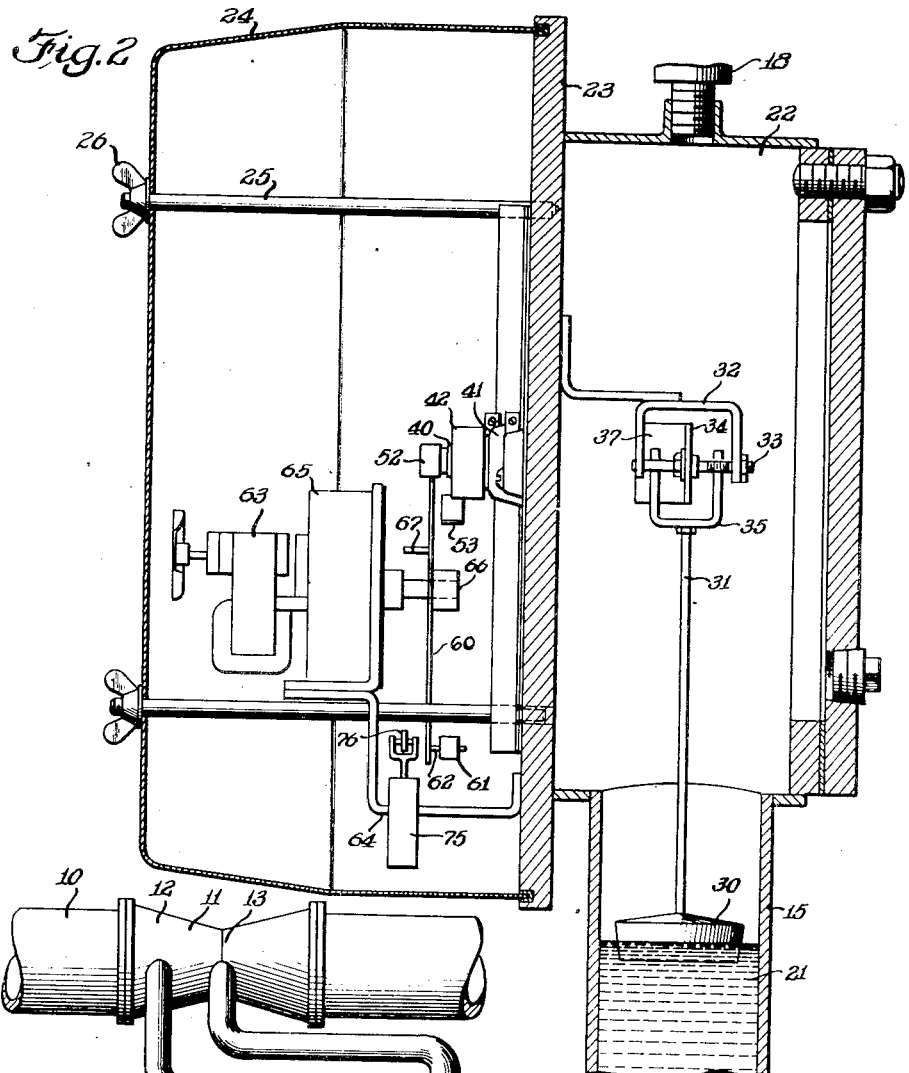
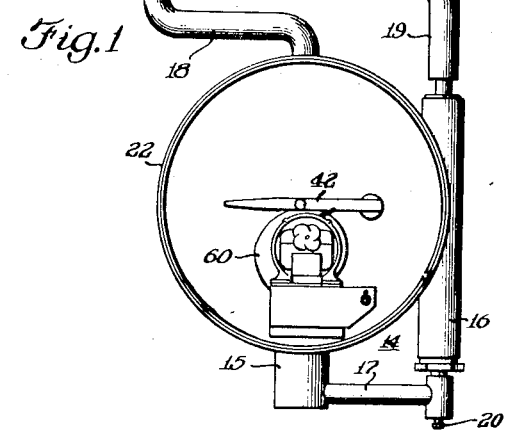
INVENTOR.
Samuel L. Adelson
BY
Atty.

April 6, 1948.

S. L. ADELSON 2,439,121

RATE OF FLOW TELEMETERING ACTUATOR

Filed Nov. 26, 1945

INVENTOR.
Samuel L. Adelson
BY
Atty.

Patented Apr. 6, 1948

2,439,121

UNITED STATES PATENT OFFICE 2,439,121

RATE OF FLOW TELEMETERING ACTUATOR

Samuel L. Adelson, Chicago, Ill., assignor to Infilco Incorporated, Chicago, Ill., a corporation of Delaware Application November 26, 1945, Serial No. 630,896

10 Claims. (Cl. 318—445)

This invention relates to a telemetering apparatus which controls the rate at which a machine performs its functions from the rate at which fluid flows through a conduit.

An object of this invention is to provide an apparatus controlling the application of power to a machine automatically in proportion to the flow of fluid to a conduit.

Another object of this invention is to provide for automatically controlling the operation of a chemical feeder in such a manner that it discharges a chemical proportionately to the flow of liquid to be treated—the rate of discharge of the chemical feeder being proportional to the rate of flow of liquid through a conduit.

A still further object of this invention is to provide an improved telemetric transmitter providing an impulse of a length directly proportional to the flow of fluid through a conduit.

Another object of this invention is to provide a means of closing a first circuit at regular intervals and closing a second circuit at a time interval after the closing of the first circuit proportional to the rate of flow of fluid through a conduit.

A still further object of this invention is to provide an operating circuit for a machine which is closed at regular intervals and remains closed for a length of time proportional to the rate of flow of fluid through a conduit.

Another object of my invention is to provide a hydraulic actuator operated by differences in pressure of fluid in a conduit, the actuator containing no stuffing boxes such as heretofore used which result in loss of sensitivity of the apparatus.

While my invention is not limited to controlling the operation of the motor of a chemical feeder (and thus the discharge of chemical into a fluid being treated) proportional to the rate of flow of such fluid, it is particularly adapted for such purpose. The invention will therefore be described in connection with the operation of a motor driven chemical feeder proportional to the flow of water, whereby a constant dosing of the water is maintained in spite of variations in the flow of the water.

Briefly, my invention comprises means whereby an electric circuit is momentarily closed at regular intervals, the closing of which circuit automatically starts the delivery of electric power to some machine (for example, delivering electric power to a motor driving a chemical feeder); and means whereby a second electrical circuit is momentarily closed to terminate the delivery of power to the machine, the closing of the second circuit being spaced from the closing of the first circuit a time interval proportional to the rate of flow of a liquid through a conduit. Since, in the example, the chemical discharged by the feeder is proportional to the time the feeder functions, i. e. to the interval between the closing of the two circuits, the discharge of the feeder is proportional to the flow rate of the liquid.

My invention will be more readily understood by reference to the drawings which form a part hereof and in which:

Figure 1 is a front view of the apparatus of my invention shown in position in relation to a pressure creating device, such as a Venturi tube.

Figure 2 is an enlarged sectional side view of the actuator shown in Figure 1.

Figure 3:
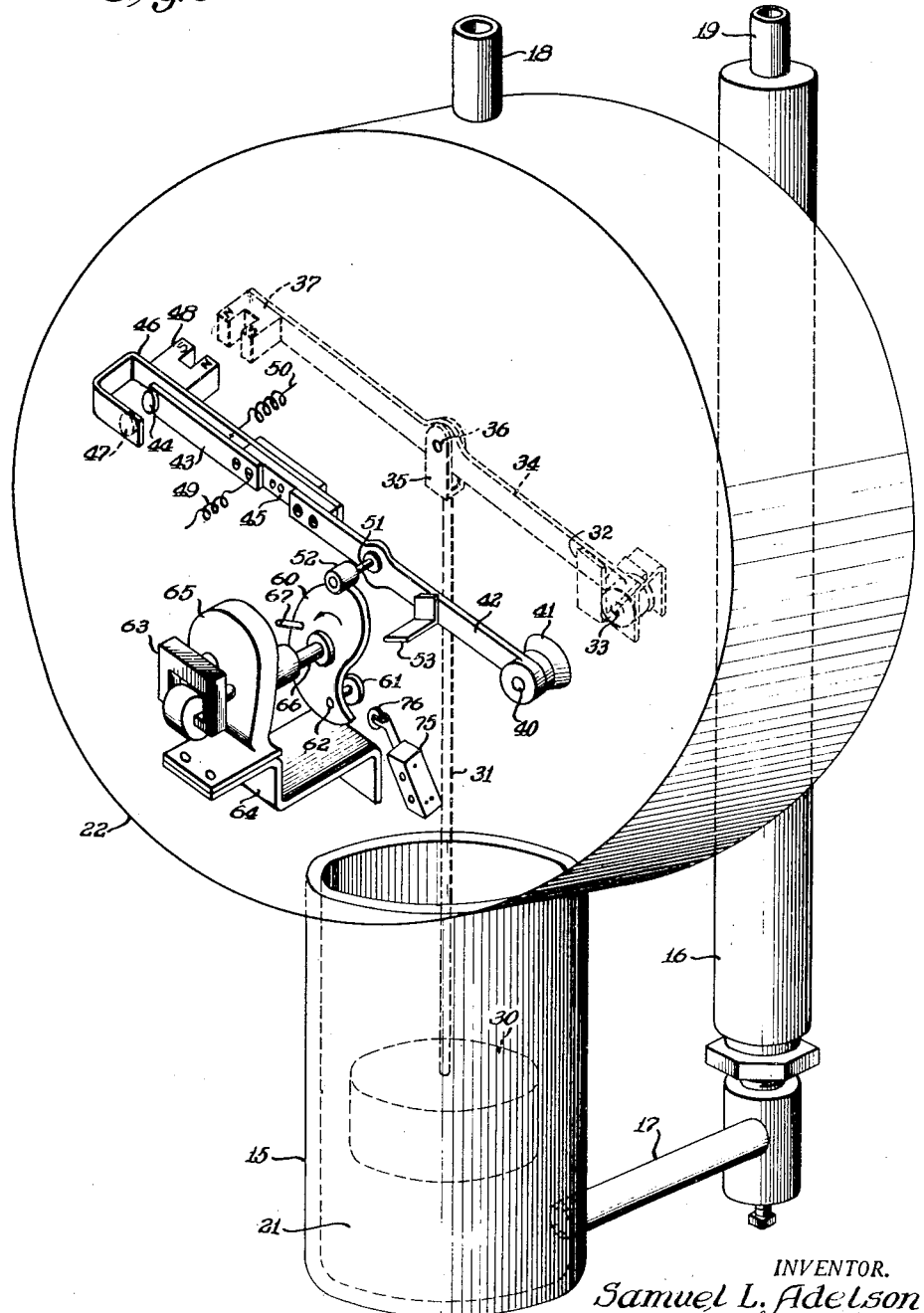
Figure 3 is an enlarged isometric view of the actuator mechanism of my invention, with cover removed.

Figure 1 shows a conduit 10, adapted for carrying a flow of fluid, such as water. The conduit 10 includes a differential pressure creating device, such as the Venturi tube 11. As is well known in the art, the pressure at the inlet 12 of the Venturi tube 11 is greater than the pressure at the throat 13 thereof, the pressure differential thus created varying as the square of the rate of flow therethrough. A manometer 14 (comprising a high pressure chamber 15, and a low pressure chamber 16, which are connected one with another through a conduit 17) is connected to the Venturi tube 11 in the usual manner. As is customary, a pressure conduit 18 leads from the inlet 12 of the Venturi tube 11 to the high pressure chamber 15 of the manometer, and a low pressure conduit 19 leads from the throat 13 of the Venturi tube to the low pressure chamber 16 of the manometer. A drain 20 can be placed in the manometer, such as at the bottom of the low pressure chamber 16, for removal of manometric fluid 21, such as mercury, therefrom. The high pressure chamber or leg 15 of the manometer is enlarged at its upper portion to form an actuator casing 22 which contains part of the mechanism of my invention. The casing is provided with a face 23 (Figure 2) and some of the mechanism of my invention is mounted on the outside of the face. To protect such parts I prefer to provide a transparent and removable cover 24, held in place by any suitable means such as threaded rods 25 and wing bolts 26.

The operation of a manometer is well known and may be dismissed with a brief description. A manometric fluid 21, such as mercury, is placed in the manometer, the level in the two legs, 15 and 16, being the same at zero flow. When fluid flows through the conduit 10 and Venturi tube 11, a pressure differential exists between the inlet 12 and throat 13 of the Venturi tube, the pressure at the inlet being greater than that at the throat. These pressures are communicated to the two legs of the manometer, causing the mercury in the high pressure leg 15 to lower, and the level of the mercury in the low pressure leg 16 to rise, the difference in levels from the datum, or zero, level being a function of the rate of flow through the conduit 10. Thus for each and every rate of flow through the conduit and Venturi tube, there is a corresponding level of mercury or other manometric fluid in each of the legs of the manometer.

Referring now to Figures 2 and 3, it will be seen that I provide a float 30, adapted to ride on the mercury, or other manometric fluid, in the high pressure leg 15. It is preferred that the level of the mercury 21 in the manometer at the datum, or zero flow, position be in the lower portion of the high pressure leg 15 as shown. Extending upwardly from the float 30 is a link 31 which extends to an intermediate elevation of the casing 22. The face 23, of the casing 22, is formed of non-magnetic material of suitable thickness. In the interior of the casing, 22 is a bracket 32 placed at one side of the casing, as shown in Figure 3. The bracket 32 supports a freely rotatable spindle 33 on which is mounted an arm, or lever 34. The free end of the float link 31 is pivotally attached to the arm 34, as by means of yoke 35 and pin 36. At the free end of the arm 34 is affixed a permanent magnet 37 of suitable physical characteristics.

It will be obvious that when there is no flow through the conduit 10 of Figure 1, the mercury levels in the high pressure leg 15 and low pressure leg 16 of the manometer will be in the same plane, and the arm 34 will assume its highest, or zero flow, position. As the flow increases the level of mercury 21 in the float chamber 15 will drop a distance proportional to the difference in pressure between the inlet 12 and throat 13 of the Venturi tube. Thus at any rate of flow the float 30 will have lowered a definite distance and this will move the arm 34 through a definite angle from its zero flow position. Obviously, as the rate of flow through the conduit 10 varies, the angular position of the arm 34 will vary accordingly.

A spindle 40 is fixed to the exterior of face 23 by any suitable means, such as bracket 41—the spindle 40 being aligned axially with the inner spindle 33 on which the inner arm 34 is mounted. Mounted on this outer spindle 40 is an arm 42 of a total length corresponding to the length of arm 34. Preferably the arm 42 will have a contact strip 43 at the outer end, and this will be provided with a contact point 44. The strip 43 is separated from the balance of the arm 42 by an insulating piece 45. The insulating piece 45 also carries a flexible contact strip 46 bearing a contact point 47 which, on flexing of the flexible contact strip 46 toward the face 23 of the casing 22 will contact the contact point 44. Also mounted on the flexible contact strip 46 is a magnet 48 mounted at a distance from the spindle 40, equal to the distance between the spindle 33 and the magnet 37 of the inner assembly. The complete assembly constitutes a magnet operated switch which is closed when the outer arm 42 is parallel to the inner arm 34. The outer magnet 48 has its poles reversed in relation to the inner magnet, as shown by the letters "N" and "S" in Figure 3, so that the two magnets attract each other. Thus, when the two magnets are at adjacent locations on opposite sides of the non-magnetic face 23, the outer magnet 48 is pulled towards the face to bring the contacts 44 and 47 together and close the magnetic switch on the outside of the manometer. Wires 49 and 50 connect the contact strips 43 and 46, respectively, to opposed contacts 125 and 124 of a relay 120, hereafter described.

A synchronous motor 63 is mounted on the outside of hte non-magnetic face 23 by any suitable means, such as bracket 64. The motor 63 preferably has a built-in speed reducer 65 which drives a shaft 66 at a slow speed such as one-half to one revolution per minute. Mounted on the shaft 66 is the square root cam 60. The outside arm 42 is also provided with a pin 51 on which is rotatably mounted a roller 52 riding on the edge of the square root cam 60. The cam is provided with the pin 62 on which is mounted roller 61 that once in each revolution of the cam 60 comes in contact with a projection 53 of the outer arm 42 to lift the arm 42 rapidly to its highest position, and then lower the arm 42 so that the roller 52 again contacts the cam a short distance ahead of the zero time position of the outer arm.

The cam 60 also is provided with a pin 67 which is adapted to come into engagement with the roller 76 of a single pole, double throw switch 75, adjustably mounted on the outside of the face 23. Preferably the switch 75 is of a well known manufacture, known as a micro switch, and which has no off position. That is, when the pin 67 is not in engagement with the roller 76, the pole 77 (see Figure 4) of the switch is in contact with one of the terminals 78, and when the pin is enaged with this roller, the pole is in contact with the other terminal, 79. The pin 67 is so located on the cam 60 that the pin 67 contacts the roller 76 of the micro-switch 75 when the arm 42 reaches its zero time position on its downward travel.

The motor 63 and the cam 60 rotate at a constant speed and the roller 52, following the contour of cam 60, will cause the outer arm 42, to oscillate about the shaft 40, through a definite angle, its highest position being slightly above the zero position of arm 34 and its lowest position being below the position of the inner arm 34 at periods of highest designed flow. As indicated above, when the arm 42 reaches its zero time position the pin 67 momentarily engages the roller 76 of the micro switch 75 to momentarily close one circuit and to open another. These circuits will be referred to in the discussion of Figure 4. When the arm 42 reaches its lowest position, roller 61 of the cam 60 engages the projection 53, on the arm 42 to effect a quick return of arm 42 to its highest position. The rate of downward travel of the arm 42 is of importance, and this is governed by the contour of the cam 60. The rate of upward travel of arm 42 is not important so long as it requires a relatively short time of travel from its lowermost to its uppermost position.

It is well known by those versed in the art that the differential pressure across the upstream and throat sections of the Venturi tube varies as the square of the flow. Accordingly the cam 60 must be what is known as a "square root cam," that is, the cam is so shaped that the angular movement downward of arm 42 will vary as the square of the angular movement of the cam. The angular position of the arm 34, measured from its zero position, will vary as the square of the flow. It is necessary that the interval between the momentary contact of the micro-switch 75 and contact between the points 44 and 47 previously referred to, shall be proportional to the flow. Thus, the contour of the cam 60 is such that the downward angular movement of the outer arm 42 will vary as the square of the time, measured from the instant it begins its downward travel.

Assuming that because of a certain flow rate through the conduit 10, the inner arm 34 is at a certain position below the zero flow position. When the outer arm 42 reaches its zero time position in its downward movement, pin 67 on cam 60 will engage the roller 76 of the micro switch 75 to open one circuit and close another. When this pin 67 passes out of engagement with the roller 76, the switch 75 will assume its original position. In its downward travel the magnet 48, affixed to the outer arm 42, will come within the magnetic field of the inner magnet 37. Since the pole faces of the magnets are oppositely disposed, the outer magnet 48 will move towards the inner magnet 37 and cause the two contact points 44 and 47 to come in contact. This will cause closure of a circuit later to be described in detail, which includes conductor 49, contact strip 43, contact 44, contact 47, contact strip 46 and conductor 50.

Figure 4:
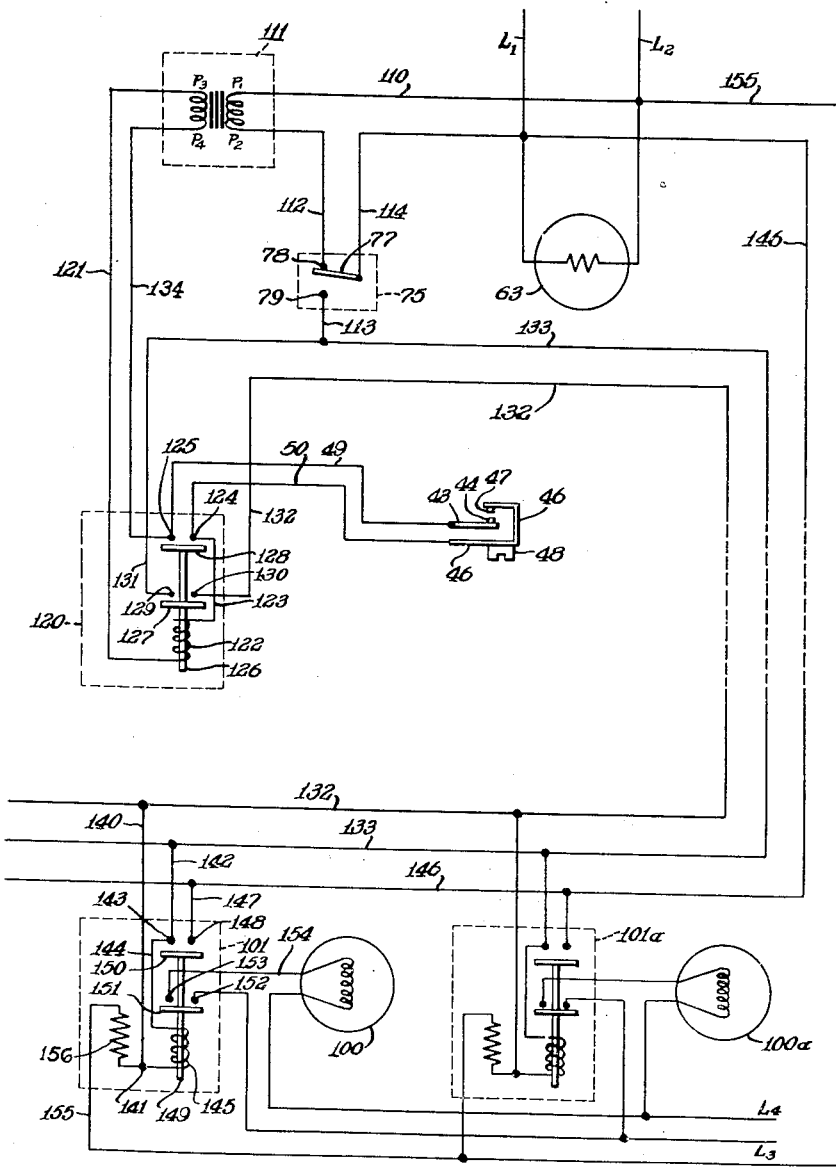
Figure 4 is a diagrammatic wiring diagram showing the connection of the actuator of my invention to two motors, such as might drive two chemical feeders.

The wiring diagram connecting the actuator mechanism just described and the machine to be operated, is shown diagrammatically in Figure 4. For purposes of illustration the wiring diagram is shown as controlling the operation of two motors, 100 and 100a, remotely located from the actuator mechanism of my invention. Motors 100 and 100a are supplied with power from lines L3 and L4. The flow of power to each of the motors is controlled by a three wire control type relay 101 and 101a, respectively, preferably mounted directly on the motors. The two relays 101 and 101a are identical and are connected in parallel to the actuator mechanism, so that for purposes of simplification the reference characters will be applied only to the relay 101. It is believed obvious that the number of machines to be controlled may vary to any desired number so long as the machines are controlled by a single actuator.

A branch line 110 leads from source of alternating current power L2 to pole P1 of the primary of a low voltage secondary transformer 111. Low voltage is used because the contacts 44 and 47 are exposed. The other pole P2 of the primary of transformer 111 is connected by wire 112 to the contact 78 of the micro switch 75. The other contact 79 of the micro switch 75 is connected by wire 113 to conductor 133 to be described hereafter. The movable pole 77 of the micro switch 75 is connected by wire 114 to source of power L1.

A conductor 121 leads from secondary terminal P3 of the transformer 111 to coil 122 of a two pole relay 120 and thence by conductor 123 to contact 124 of the relay. A second wire 134 leads from the secondary terminal P4 of transformer 111 to contact 125 of the relay 120. As previously indicated, the wire 49 leads from the contact strip 43 to contact 125; and the wire 50 leads from the contact strip 46 to contact 124. Associated with the coil 122 is a core 126 having contact strips or bridges 127 and 128. When the coil 122 is energized, thus raising the core 126, contact strip 127 will connect contacts 129 and 130, to which are connected wires 131 and 132 respectively. Line 131 is connected to lines 113 and 133 as shown.

Conductor 132 is connected to another conductor 140, which leads to binding post 141 of the relay 101 and line 133 is connected to conductor 142, which leads to contact 143, of the relay 101. Contact 143 and post 141 are connected to each other through wire 144 and coil 145 of the relay. Conductor 146 leads from source of power L1 to conductor 147 which terminates at contact 148 of the relay 101. The core 149 associated with the coil 145 is provided with two poles 150 and 151. Pole 150 engages the contacts 143 and 148 when the coil is energized to lift the core 149. The other pole 151 engages contacts 152 and 153 when the coil 145 is energized to lift the core 149. Contact 152 is connected to power line L3 and contact 153 is connected by conductor 154 to the motor 100. A conductor 155 leads from source of power L2 through resistor 156 to binding post 141 of relay 101.

The motor 63 which carries the cam 60 is, as shown, connected directly across lines L1 and L2 and thus rotates continuously. Immediately before the arm 42 has reached its uppermost position in its upward direction of travel, the switch 75 and the relay 120 are in the position shown in Figure 4, and the contacts 44 and 47 will be separated and the relay 101 will be de-energized as shown in the drawing. At this point the motors 100 are stopped. At the instant the arm 42 reaches its zero time position moving downward, the pin 67 on cam 60 (Figure 2 or 3) will engage the roller 76 of the switch 75 and the pole 77 will engage the post 79. This will complete a momentary circuit from L1 through conductor 114, pole 77 of the switch 75, contact 79, line 113, conductors 133, 142 and 144, coil 145 of the relay 101, binding post 141, resistor 156, and conductor 155 back to L2. Thus the coil 145 will be energized and pole 151 will bridge contacts 152 and 153 of relay 101 to start the motor 100, which secures its power from the source of power L3 and L4. At the same instant, pole 150 will bridge contacts 143 and 148 of relay 101 to close a second circuit which begins with source of power L1 and leads through conductors 146 and 147, contact 148, pole 150, contact 143, conductor 144, coil 145, resistor 156, and conductor 155 back to L2. This second circuit comprises a holding circuit which holds the relay closed after the momentary contact between the pole 77 and the contact 79 of the micro switch 75. The motor 100 therefore continues to run. It is obvious that operation of the motor 100 has been initiated by the momentary contact in the micro switch 75, between the pole 77 and the contact 79 and continues even after the first circuit is broken.

In the continued downward movement of arm 42 and magnet 48, the latter will reach the field of attraction of the inner magnet 37 on arm 34 (which as already indicated, has a position corresponding to the flow rate) and the outer magnet 48 will then be attracted by the inner magnet 37 and contact will be made between contacts 47 and 44. This will complete a circuit from secondary pole P4 of the transformer 111 through conductors 134 and 49, contact strip 43, contacts 44 and 47, flexible contact strip 46, conductors 50 and 123, coil 122 and conductor 121 to the secondary pole P₃ of the transformer. This circuit obviously energizes coil 122 to raise the core 126. The pole 127 will thereupon come in contact with the contacts 129 and 130 and the pole 128 will contact the contacts 124 and 125. This action of the relay 120 initiates a third circuit beginning at post P₄ of the transformer 111, through conductor 134, pole 128, conductor 123, coil 122, and conductor 121 back to post P₃ of the transformer. At the same time the bridging of contacts 129 and 130 by the pole 127, short circuits coil 145 of the relay 101 as follows: From contact 143 of relay 101 through conductors 142, 133 and 131, contact 129 of relay 120, pole 127, contact 130, and conductors 132 and 140 to post 141 of relay 101—thereby short circuiting coil 145. Resistance in this short circuiting circuit is of very low value compared to the impedance of the coil, 145, so the coil is short-circuited. Thus the relay 101 is de-energized and the contacts 152 and 153 are unbridged, stopping the motor 100.

In the movement of the arm 42 from its lowermost position towards its highest position, the outer magnet 48 will again come within the field of attraction of magnet 37, again effecting closure of the contacts 43 and 46. This closing at this point, however, will not affect the condition of the circuits in their then existing condition since relay 120 is held closed by the interlocking, or holding, circuit above described which leads from the transformer 111, through conductor 134, pole 128, coil 122 and conductor 121 back to the transformer. However, when the arm 42 reaches its uppermost position and begins its downward travel, the pin 67 again contacts the roller 76 of the micro switch 75 to first break the contact between pole 77 and contact 78 of the micro switch. This will break the circuit of the transformer 111 thereby removing power from its secondary coil and de-energize coil 122 of the relay 120, thus opening all of the contacts of the relay. When the pole 77 engages the contact 79, it will close the relay 101 to start a new cycle as outlined above.

It is thus seen that the momentary closure between the pole 77 and the contact 79 of the micro switch 75 starts the motor 100, and the momentary closure of the contacts 44 and 47 stops the motor 100 thus giving a length of operation of the motor corresponding directly to the rate of flow of fluid through the conduit 10.

Manifestly, many modifications and variations of the invention herein set forth may be made by persons skilled in the art without departing from the spirit and scope thereof. Accordingly the appended claims are to be given an interpretation commensurate with the novelty herein described and as broad as may be permitted by prior art. It will also be understood that although the present invention has been described as relating to the control of chemical feeders associated with a liquid treating plant, it is not to be construed as limited thereto.

I claim:

1. Apparatus of the type described comprising a manometer, a magnet positioned by level of a manometric liquid in said manometer, a movable normally open magnet operated switch outside of said manometer, means to cyclically move said magnet operated switch along a path parallel to the potential path of travel of said first magnet, and a switch device operative to close a starting circuit at a predetermined position of said magnet operated switch.

2. An actuator adapted to provide operation of a motor for a period of time proportional to the rate of flow through a conduit comprising a manometer adapted to hold a manometric fluid, a float adapted to ride on said manometric fluid, a lever connected to said float, a magnet on the free end of said lever, a lever on the outside of said manometer coaxially fulcrumed with said first mentioned lever, a normally open magnetically operated switch carried on the free end of said lever, a constant speed motor, a cam driven by said motor, said cam being so constructed and arranged as to move said second lever in one direction during a relatively small portion of one rotation of said cam and to move said second lever in the other direction at a predetermined rate during a relatively large portion of such rotation, and a switch operated by said cam to temporarily open one circuit and close another at the time when the second lever is at its zero time position.

3. A rate of flow telemetering device adapted to provide an impulse of a time duration directly proportional to the rate of flow comprising a manometer, a magnet on the interior of said manometer adapted to be positioned by level of a manometric liquid therein, a movable normally open magnet operated switch outside of said manometer, means to cyclically move said magnet operated switch along a path parallel to the potential travel of said first magnet, a switch device operative to momentarily close a circuit at a predetermined position of said movable magnetic switch, an electric motor, a power circuit to said motor, a relay in said circuit, said relay being connected to said switch device in such a manner that it is actuated upon the momentary closing of said switch device to close said power circuit, a holding circuit connected to said relay in such a manner as to hold it in a closed position and thereby maintain said power circuit closed, and a third circuit connecting said magnetically operated switch to said relay and adapted to open said relay to break said power circuit upon closing of the magnetic switch.

4. An actuator of the class described comprising a manometer adapted to hold a manometric fluid, a float adapted to ride on said manometric fluid, a lever connected to said float, a magnet on the free end of said lever, a lever on the outside of said manometer coaxially fulcrumed with said first mentioned lever, a normally open magnetically operated switch carried on the free end of said lever, a constant speed motor, a cam driven by said motor, said cam being so constructed and arranged as to rapidly raise said second lever from its lowermost to its uppermost position and to slowly lower said second lever at a gradually increasing rate, a switch operated by said cam to momentarily close a first circuit at the time when the second lever is at its zero time position, an electric motor, a power circuit to said motor, a relay in said circuit, said relay being actuated upon the momentary closing of said first circuit to close said power circuit, a holding circuit holding said relay in a closed position, and another circuit being closed by said magnetically operated switch and adapted to break said holding circuit and open said relay, thereby breaking said power circuit upon closing of the magnetic switch.

5. A rate of flow telemetering device adapted to provide an impulse of a time duration proportional to the rate of flow through a conduit comprising a motor to be operated, a power circuit connected to said motor, a relay in said power circuit, means to energize said relay at the beginning of a fixed time cycle, a holding circuit to maintain said relay in said closed position, a short circuiting circuit adapted to deenergize said relay, a normally open switch in said short circuiting circuit, and switch closing means for closing said open switch at an interval after the closing of the power circuit proportional to the rate of flow through the conduit.

6. A rate of flow telemetering device adapted to provide an impulse of a time duration directly proportional to the rate of flow through a conduit comprising a motor to be operated, a power circuit connected to said motor, a relay in said power circuit, means to energize said relay at fixed time intervals, a holding circuit to maintain said relay in said closed position, a short circuiting circuit adapted to de-energize said relay, and means proportional to the rate of flow of liquid through a conduit for opening said holding circuit at an interval after the closing of the first mentioned circuit proportional to the rate of flow through the conduit, said means including a manometer, a magnet in said manometer positioned by the level of manometric fluid in said manometer, a magnetically operated switch outside said manometer, said short circuiting circuit being closed by said magnetically operated switch, and means cyclically moving said magnetic switch along a path parallel to the potential travel of said first magnet.

7. The apparatus of claim 6 wherein said means for moving said magnetic switch travels a distance in one direction which is proportional to the square of the time it has traveled in that direction from the beginning of a cycle.

8. The apparatus of claim 6 wherein said means for moving said magnetic switch travels a distance in a downward direction which is proportional to the square of the time of its downward travel from the zero time position and wherein said relay is energized when said magnetic switch is at the zero position of said magnet.

9. In a flow system including a conduit, a pressure differential creating device in said conduit and a motor to be cyclically operated for a period of time corresponding to the rate of flow through said conduit, the combination with said pressure differential creating device and said motor of a manometer connected to said pressure differential creating device, a magnet in said manometer positioned by the level of fluid therein, a relay controlling operation of said motor, means to periodically energize said relay, a holding circuit for said relay, a magnetically operated switch outside said manometer, means including a cam for cyclically moving said magnetic switch at a predetermined rate along a path parallel to potential movement of said magnet inside said manometer and then rapidly returning it to a starting position, and a short circuiting circuit connected to said relay and so constructed and arranged as to be closed upon the closing of said magnetically operated switch and adapted to break said holding circuit.

10. In a flow system including a conduit, a pressure differential creating device in said conduit and a motor to be cyclically operated for a period of time corresponding to the rate of flow through said conduit, the combination with said pressure differential creating device and said motor of a manometer connected to said pressure differential creating device, a magnet in said manometer positioned by the level of fluid therein, a movable normally open magnet operated switch outside of said manometer, means to cyclically move said magnet operated switch along a path parallel to the potential travel of said first magnet, a relay controlling operation of said motor, an energizing circuit for said relay, a switch device in said energizing circuit momentarily closed at a predetermined position of said magnetic switch, a holding circuit for said relay for holding said relay closed after the energization thereof, a short circuiting circuit adapted to de-energize said relay and so constructed and arranged as to be closed upon the closing of said magnetically operated switch.

SAMUEL L. ADELSON.

REFERENCES CITED

The following references are of record in the file of this patent:

UNITED STATES PATENTS

| Number | Name | Date |
| --- | --- | --- |
| 1,537,578 | Bouton | May 12, 1925 |
| 2,059,151 | Smith | Oct. 27, 1936 |
| 2,224,722 | Eames | Dec. 10, 1940 |
| 2,243,475 | Dallmann et al. | May 27, 1941 |